United States Patent
Tse et al.

(10) Patent No.: US 10,185,895 B1
(45) Date of Patent: Jan. 22, 2019

(54) SYSTEMS AND METHODS FOR CLASSIFYING ACTIVITIES CAPTURED WITHIN IMAGES

(71) Applicant: GOPRO, INC., San Mateo, CA (US)

(72) Inventors: Daniel Tse, San Mateo, CA (US); Desmond Chik, San Mateo, CA (US); Guanhang Wu, Hunan (CN)

(73) Assignee: GoPro, Inc., San Mateo, CA (US)

(*) Notice: Subject to any disclaimer, the term of this patent is extended or adjusted under 35 U.S.C. 154(b) by 72 days.

(21) Appl. No.: 15/467,546

(22) Filed: Mar. 23, 2017

(51) Int. Cl.
*G06K 9/46* (2006.01)
*G06K 9/34* (2006.01)
*G06N 3/04* (2006.01)
*G06K 9/62* (2006.01)
*G06K 9/00* (2006.01)
*G06T 5/20* (2006.01)

(52) U.S. Cl.
CPC ....... *G06K 9/6267* (2013.01); *G06K 9/00744* (2013.01); *G06T 5/20* (2013.01); *G06K 2009/00738* (2013.01); *G06T 2207/20084* (2013.01)

(58) Field of Classification Search
CPC ........... G06K 9/00684; G06K 9/00664; G06K 9/00671; G06K 9/00624; G06K 9/0063
See application file for complete search history.

(56) References Cited

U.S. PATENT DOCUMENTS

| | | |
|---|---|---|
| 5,130,794 A | 7/1992 | Ritchey |
| 6,337,683 B1 | 1/2002 | Gilbert |
| 6,593,956 B1 | 7/2003 | Potts |
| 7,222,356 B1 | 5/2007 | Yonezawa |
| 7,483,618 B1 | 1/2009 | Edwards |
| 8,446,433 B1 | 5/2013 | Mallet |
| 8,611,422 B1 | 12/2013 | Yagnik |
| 8,718,447 B2 | 5/2014 | Yang |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Xiao, Qiqi, et al. "Cross domain knowledge transfer for person re-identification." arXiv preprint arXiv:1611.06026 (2016). (Year: 2016).*

(Continued)

*Primary Examiner* — Bobbak Safaipour
(74) *Attorney, Agent, or Firm* — Sheppard Mullin Richter & Hampton LLP

(57) ABSTRACT

An image including a visual capture of a scene may be accessed. The image may be processed through a convolutional neural network. The convolutional neural network may generate a set of two-dimensional feature maps based on the image. The set of two-dimensional feature maps may be processed through a contextual long short-term memory unit. The contextual long short-term memory unit may generate a set of two-dimensional outputs based on the set of two-dimensional feature maps. A set of attention-masks for the image may be generated based on the set of two-dimensional outputs and the set of two-dimensional feature maps. The set of attention-masks may define dimensional portions of the image. The scene may be classified based on the two-dimensional outputs.

16 Claims, 6 Drawing Sheets

(56) References Cited

U.S. PATENT DOCUMENTS

| | | |
|---|---|---|
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |

(56) References Cited

U.S. PATENT DOCUMENTS

| | | | |
|---|---|---|---|
| 2017/0006214 A1 | 1/2017 | Andreassen | |
| 2018/0129899 A1* | 5/2018 | Harron | G06K 9/34 |
| 2018/0150740 A1* | 5/2018 | Wang | G06T 7/11 |

OTHER PUBLICATIONS

Lee, Gayoung, Yu-Wing Tai, and Junmo Kim. "Deep saliency with encoded low level distance map and high level features." Proceedings of the IEEE Conference on Computer Vision and Pattern Recognition. 2016. (Year: 2016).*

Ricker, "First Click: TomTom's Bandit camera beats GoPro with software" Mar. 9, 2016 URL: http://www.theverge.com/2016/3/9/11179298/tomtom-bandit-beats-gopro (6 pages).

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., "Deep Residual Learning for Image Recognition," arXiv:1512.03385, 2015, 12 pgs.

Iandola et al., "SqueezeNet: AlexNet-level accuracy with 50x fewer parameters and <0.5MB model size," arXiv:1602.07360, 2016, 9 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Ioffe et al., "Batch Normalization: Accelerating Deep Network Training by Reducing Internal Covariate Shift," arXiv:1502.03167, 2015, 11 pgs.

Parkhi et al., "Deep Face Recognition," Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

PCT International Search Report and Written Opinion for PCT/US2015/023680, dated Oct. 6, 2015, 13 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 pages.

Schroff et al., "FaceNet: A Unified Embedding for Face Recognition and Clustering," IEEE Conference on Computer Vision and Pattern Recognition (CVPR), 2016, 10 pgs.

Tran et al., "Learning Spatiotemporal Features with 3D Convolutional Networks", arXiv:1412.0767 [cs.CV] Dec. 2, 2014 (9 pgs).

Yang et al., "Unsupervised Extraction of Video Highlights Via Robust Recurrent Auto-encoders" arXiv:1510.01442v1 [cs.CV] Oct. 6, 2015 (9 pgs).

Ernoult, Emeric, "Flow to Triple Your YouTube Video Views with Facebook", SocialMediaExaminer.com, Nov. 26, 2012, 16 pages.

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

* cited by examiner

Standard LSTM formulation 400

$$i_t = \sigma(W_{xi} x_t + W_{hi} h_{t-1} + W_{ci} \,^o c_{t-1} + b_i)$$
$$f_t = \sigma(W_{xf} x_t + W_{hf} h_{t-1} + W_{cf} \,^o c_{t-1} + b_f)$$
$$c_t = f_t \,^o c_{t-1} + i_t \,^o \tanh(W_{xc} x_t + W_{hc} t_{t-1} + b_c)$$
$$o_t = \sigma(W_{xo} x_t + W_{ho} h_{t-1} + W_{co} \,^o c_t + b_o)$$
$$h_t = o_t \,^o \tanh c_t$$

FIG. 4A

C-LSTM formulation 450

$$i_t = \sigma(W_{xi} * x_t + W_{hi} * h_{t-1} + W_{ci} \,^o c_{t-1} + b_i)$$
$$f_t = \sigma(W_{xf} * x_t + W_{hf} * h_{t-1} + W_{cf} \,^o c_{t-1} + b_f)$$
$$c_t = f_t \,^o c_{t-1} + i_t \,^o \tanh(W_{xc} * x_t + W_{hc} * t_{t-1} + b_c)$$
$$o_t = \sigma(W_{xo} * x_t + W_{ho} * h_{t-1} + W_{co} \,^o c_t + b_o)$$
$$h_t = o_t \,^o \tanh c_t$$

FIG. 4B

Non-Overlapping Loss 500

$$T - \Sigma_{i=1}^{nrows}\Sigma_{j=1}^{ncols} max_{k \in \{1,...,T\}} A_{ijk}$$

FIG. 5A

Entropy (Uniformness) Loss 550

$$\frac{1}{nrows \cdot ncols} - \Sigma_{k=1}^{T}\Sigma_{i=1}^{nrows}\Sigma_{j=1}^{ncols} A_{ijk} log A_{ijk}$$

FIG. 5B

SYSTEMS AND METHODS FOR CLASSIFYING ACTIVITIES CAPTURED WITHIN IMAGES

FIELD

This disclosure relates to systems and methods that classify activities captured within images.

BACKGROUND

A standard long short-term memory unit may be used to determine attention maps. The standard long short-term memory unit may use a one-dimensional hidden state, which does not preserve local information. Local information may be important for action recognition tasks.

SUMMARY

This disclosure relates to classifying activities captured within images. An image including a visual capture of a scene may be accessed. The image may be processed through a convolutional neural network. The convolutional neural network may generate a set of two-dimensional feature maps based on the image. The set of two-dimensional feature maps may be processed through a contextual long short-term memory unit. The contextual long short-term memory unit may generate a set of two-dimensional outputs based on the set of two-dimensional feature maps. A set of attention-masks for the image may be generated based on the set of two-dimensional outputs and the set of two-dimensional feature maps. The set of attention-masks may define dimensional portions of the image. The scene may be classified based on the two-dimensional outputs.

A system that classifies activities captured within images may include one or more processors, and/or other components. The processor(s) may be configured by machine-readable instructions. Executing the machine-readable instructions may cause the processor(s) to facilitate classifying activities captured within images. The machine-readable instructions may include one or more computer program components. The computer program components may include one or more of an access component, a convolutional neural network component, a contextual LSTM unit component, an attention-mask component, a classification component, and/or other computer program components.

The access component may be configured to access one or more images and/or other information. The image(s) may include visual capture of one or more scenes. One or more images may be one or more video frames of a video. The access component may access one or more images and/or other information as input into a convolutional neural network.

The convolutional neural network component may be configured to process an image through the convolutional neural network. The convolutional neural network may include a plurality of convolution layers and/or other layers. The convolutional neural network may generate a set of two-dimensional feature maps based on the image and/or other information. In some implementations, the set of two-dimensional feature maps may be generated by a last convolution layer in the convolutional neural network. In some implementations, the set of two-dimensional feature maps may be obtained from the convolutional neural network before the set of two-dimensional feature maps is flattened.

The contextual LSTM unit component may be configured to process the set of two-dimensional feature maps through a contextual long short-term memory unit. The contextual long short-term memory unit may generate a set of two-dimensional outputs based on the set of two-dimensional feature maps and/or other information. In some implementations, the set of two-dimensional outputs may be used to visualize the dimensional portions of the image. In some implementations, the set of two-dimensional outputs may be used to constrain the dimensional portions of the image.

In some implementations, the contextual LSTM unit may include a loss function characterized by a non-overlapping loss, an entropy loss, a cross-entropy loss, and/or other losses. In some implementations, the non-overlapping loss, the entropy loss, and the cross-entropy loss may be combined into the loss function through a linear combination with a first hyper parameter for the non-overlapping loss, a second hyper parameter for the entropy loss, and a third hyper parameter for the cross-entropy loss. The loss function may discourage the set of attention masks defining a same dimensional portion of the image across multiple time-steps.

The attention-mask component may be configured to generate a set of attention-masks for the image based on the set of two-dimensional outputs, the set of two-dimensional feature maps, and/or other information. The set of attention-masks may define dimensional portions of the image.

The classification component may be configured to classify the scene based on the set of two-dimensional outputs and/or other information. In some implementations, the classification of the scene may be performed by a fully connected layer that takes as input the set of two-dimensional outputs and/or other information. Classifying the scene may include classifying one or more activities within the scene. In some implementations, the classification component may be configured to classify a video based on classifications of one or more video frames of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A illustrates a standard LSTM formulation.

FIG. 4B illustrates a C-LSTM formulation.

FIG. 5A illustrates a non-overlapping loss.

FIG. 5B illustrates an entropy (uniformness) loss.

DETAILED DESCRIPTION

Figure 1:
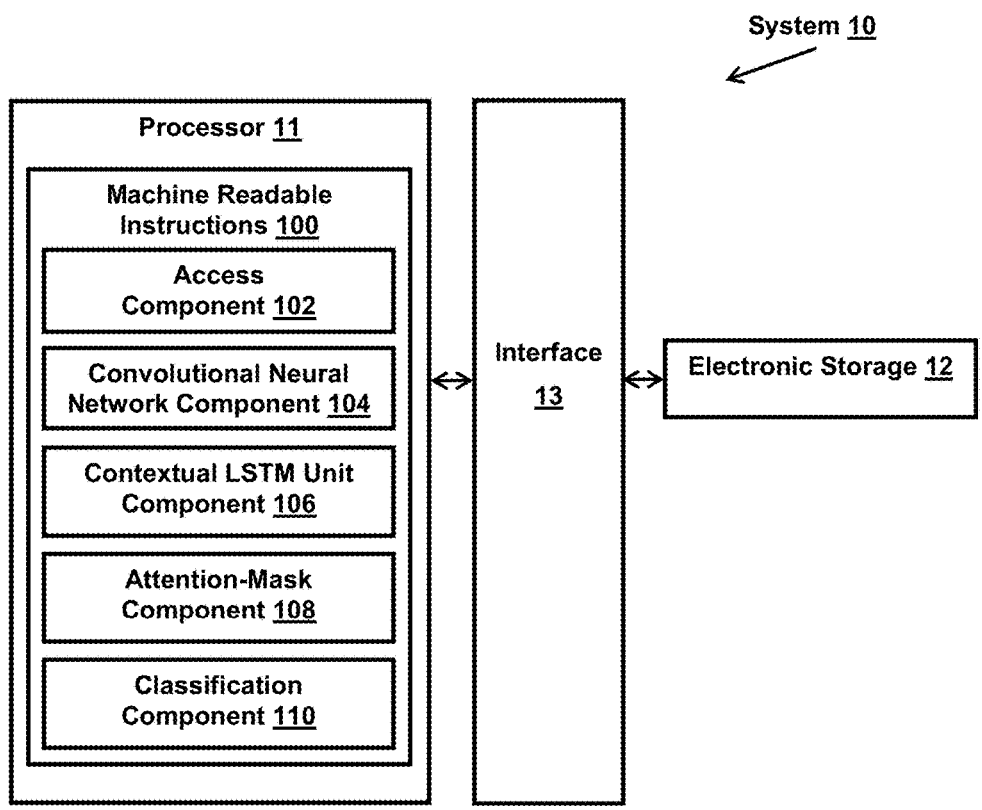
FIG. 1 illustrates a system that classifies activities captured within images.

FIG. 1 illustrates system 10 for classifying activities captured within images. System 10 may include one or more of processor 11, electronic storage 12, interface 13 (e.g., bus, wireless interface), and/or other components. An image including a visual capture of a scene may be accessed. The image may be processed through a convolutional neural network. The convolutional neural network may generate a set of two-dimensional feature maps based on the image. The set of two-dimensional feature maps may be processed through a contextual long short-term memory unit. The contextual long short-term memory unit may generate a set of two-dimensional outputs based on the set of two-dimensional feature maps. A set of attention-masks for the image may be generated based on the set of two-dimensional outputs and the set of two-dimensional feature maps. The set of attention-masks may define dimensional portions of the image. The scene may be classified based on the two-dimensional outputs.

Electronic storage 12 may be configured to include electronic storage medium that electronically stores information. Electronic storage 12 may store software algorithms, information determined by processor 11, information received remotely, and/or other information that enables system 10 to function properly. For example, electronic 12 may store information relating to images, convolutional neural network, contextual long short-term memory unit, attention-masks, scene classification, loss function, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate classifying activities captured within images. Machine readable instructions 100 may include one or more computer program components. Machine readable instructions 100 may include one or more of access component 102, convolutional neural network component 104, contextual LSTM unit component 106, attention-mask component 108, classification component 110, and/or other computer program components.

Access component 102 may be configured to access one or more images and/or other information. Image(s) may include visual capture of one or more scenes. One or more images may be one or more video frames of a video. Access component 102 may access one or more images and/or other information as input into a convolutional neural network. Access component 102 may access one or more images and/or other information from one or more storage locations. A storage location may include electronic storage 12, electronic storage of one or more image sensors (not shown in FIG. 1), and/or other locations. Access component 102 may be configured to access visual information defining one or more video content during acquisition of the image and/or after acquisition of the image by one or more image sensors. For example, access component 102 may access an image while the image is being captured by one or more image sensors. Access component 102 may access an image after the image has been captured and stored in memory (e.g., electronic storage 12).

Convolutional neural network component 104 may be configured to process an image through the convolutional neural network. A convolutional neural network may refer to a neural network that receives an input and transforms the input through a series of layers. A convolutional neural network may include a plurality of convolution layers and/or other layers. For example, a convolutional neural network may include one or more of an input layer, an output layer, a convolution layer, a padding layer, a squeeze layer, an expand layer, a concatenation layer, a combine layer, a pooling layer, a normalization layer, a fully-connected layer, an activation layer, a dropout layer, a flatten layer, and/or other layers.

A convolutional neural network may generate a set of two-dimensional feature maps based on the image and/or other information. The set of two-dimensional feature maps may include a two-dimensional activation map. The set of two-dimensional feature maps may be generated by any convolution layer (e.g., 2D filter bank) within the convolutional neural network. The set of two-dimensional feature maps may be processed through other layers, such as an activation layer, a normalization layer, a downsample layer, and/or other layers. The set of two-dimensional feature maps may be generated by a last convolution layer in a convolutional neural network. The set of two-dimensional feature maps may be obtained from a convolutional neural network before the set of two-dimensional feature maps is flattened.

Contextual LSTM unit component 106 may be configured to process the set of two-dimensional feature maps through a contextual long short-term memory unit. A long short-term memory unit may refer to a recurrent neural network architecture used to remember/retain values for durations of time. A long short-term memory unit may be implemented in blocks containing several long short-term memory units. A contextual long short-term memory unit may refer to a long short-term memory unit that incorporates contextual features into its model.

For a long short-term memory unit, images (e.g., video frames) may be processed into fixed length representations. Each representation may be fed into the long short-term memory unit one time-step at a time. Through training, the long short-term memory unit may learn what features to keep in memory so that determination may be made as to what activity is being performed within the images/video. Use of fixed length representations of images may result in loss of information as to the physical location of objects within the image. The two-dimensional spatial structure of the image may have been flattened out. An attention mechanism with a standard long short-term memory unit may use a one-dimensional hidden state. The one-dimensional hidden state may not preserve local information. Local information is important for action recognition tasks.

A contextual long short-term memory unit may be used to generate attention masks (mapping a two-dimensional image representation to a two-dimensional attention map) that directly preserve local information. The image representations that are fed into a contextual long short-term memory unit may remain a two-dimensional activation map. By taking two-dimensional representations from a convolutional neural network (e.g., before it has been flattened), local information may be preserved.

A contextual long short-term memory unit may be formulated by replacing multiplication operations of a long short-term memory unit with convolutional operations. FIG.

4A illustrates a standard LSTM formulation 400 and FIG. 4B illustrates a C-LSTM formulation 450. As shown by FIGS. 4A-4B, C-LSTM formulation 450 is obtained by replacing matrix multiplication of standard LSTM formulation 400 with convolution and applying $\sigma(\cdot)$ elementwise. Instead of having vector representations for memory, a contextual long short-term memory unit includes two-dimensional filters/convolutional maps. Whereas a long short-term memory unit takes one-dimensional input to produce a one-dimensional output and a one-dimensional hidden state vector, a contextual long short-term memory unit takes two-dimensional input to produce two-dimensional output and a two-dimensional hidden state map. In a long short-term memory unit, the state updates for input, output, and forget gates are $\sigma(Wx+b)$ linear operations with a nonlinearity. In a contextual long short-term memory unit, the state updates are obtained by convolution operations $\sigma(W*x+b)$ through a convolution operator *.

In a contextual long short-term memory unit, the input, hidden state, forget gate, output gate, and cell memory may be three-dimensional with shape (NCELLS, MAP_WIDTH, MAP_HEIGHT). Different size kernels may be used to capture different scales of spatio-temporal behaviors.

A contextual long short-term memory unit may generate a set of two-dimensional outputs based on the set of two-dimensional feature maps and/or other information. In some implementations, the set of two-dimensional outputs may be used to visualize the dimensional portions of the image. The dimensional portions of the image may refer to regions of the image the network is using to make its decisions. In some implementations, the set of two-dimensional outputs may be used to constrain the dimensional portions of the image. The dimensional portions of the image may be constrained through non-overlapping loss and entropy loss.

Figure 3:
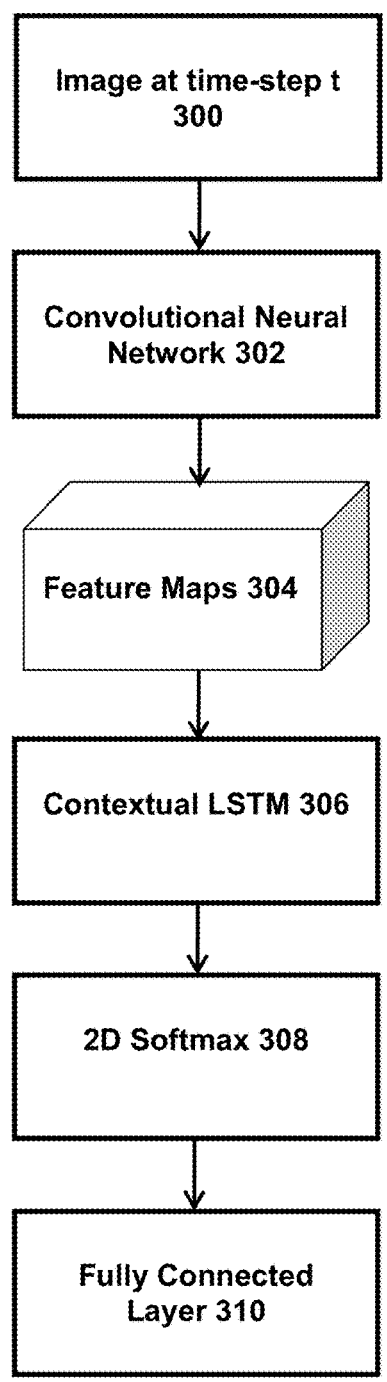
FIG. 3 illustrates an example flow process for classifying activities captured within images.

FIG. 3 illustrates an example flow process for classifying activities captured within images. As shown in FIG. 3, an image (e.g., frame) at time-step t 300 may be processed by convolutional neural network 302, and feature maps 304 may be obtained from a layer (e.g., layer convolution layer) of the convolutional neural network 302. This process may be repeated for each time-step in the window. The feature maps (e.g., activation maps) for each time-step may be passed into contextual LSTM 306 one at a time. Contextual LSTM 306 may process the same image multiple times over the time-steps to focus on different regions of the image for classification. Output of contextual LSTM 306 (which is a two-dimensional output as opposed to a one-dimensional output of a standard LSTM) may be used to visualize the region the network is using to make its decision and for classification. The visualization may be performed by processing the output through 2D softmax 308. The classification may be performed by flattening the output and passing it through fully connected layer 310.

In some implementations, a contextual LSTM unit may include a loss function characterized by a non-overlapping loss, an entropy loss, a cross-entropy loss, and/or other losses. The non-overlapping loss may encourage attention maps to not focus on the same region across multiple time-steps. The non-overlapping loss may discourage the model from relying too much on the background, or on any individual region of the image. The entropy (uniformness) loss may encourage attention maps, within one time-step, to diffuse attention across the attention maps. The entropy (uniformness loss) may discourage the model from concentrating attention too strongly on any particular cell, and encourage the model to diffuse attention at a larger region of the image. The cross-entropy loss may include a regular cross-entropy loss between the predicted per-frame class distribution and one-hot vector representing the correct class.

The loss function may discourage the attention maps defining a same dimensional portion of the image across multiple time-steps. The loss function may discourage the attention maps from concentrating on one region of the image across multiple time-steps. Instead, the loss function may encourage attention maps to look at every region in the image across multiple time-steps.

FIG. 5A illustrates non-overlapping loss 500 for the loss function. Term T may represent the number of time-steps. Terms nrows and ncols may define the size of the attention maps. Term $A_{ijk}$ may represent the entry at row i and column j of the attention map at time-step k. At each time-step, the sum of all i, j across the attention map may be one (e.g., softmax output). The non-overlapping loss 500 may reach a minimum when, across all time-steps, each cell in the attention map is covered by some time-step.

FIG. 5B illustrates entropy (uniformness) loss 550 for the loss function. Term T may represent the number of time-steps. Terms nrows and ncols may define the size of the attention maps. Term $A_{ijk}$ may represent the entry at row i and column j of the attention map at time-step k. The convention 0 log 0=0 may apply. The entropy (uniformness) loss 500 may reach a minimum when entropy is maximized—that is, when the attention maps are not concentrated too strongly on one cell.

In some implementations, the non-overlapping loss, the entropy loss, and the cross-entropy loss may be combined into the loss function through a linear combination with a first hyper parameter ($\lambda_1$) for the non-overlapping loss, a second hyper parameter ($\lambda_2$) for the entropy loss, and a third hyper parameter ($\lambda_3$) for the cross-entropy loss. The hyper parameters may be determined empirically. Changing the value(s) of the hyper parameters provides for changing the relative importance of each loss term in the loss function.

Attention-mask component 108 may be configured to generate a set of attention-masks for the image based on the set of two-dimensional outputs, the set of two-dimensional feature maps, and/or other information. The set of attention-masks may define dimensional portions of the image. At a given time-step, the output of the contextual long short-term memory unit may be multiplied elementwise with the last convolution layer in a feedforward convolutional neural network. This may result in an attention-masked convolutional layer, which may be fed into an additional fully connected layer with a number of outputs equal to the number of classes.

Figure 6A:
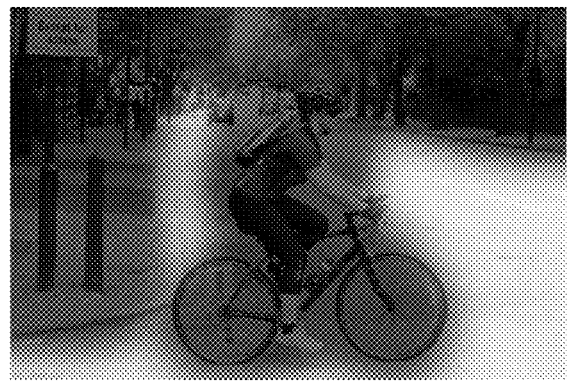
FIGS. 6A-6C illustrate example attention maps for an image.
Figure 6B:
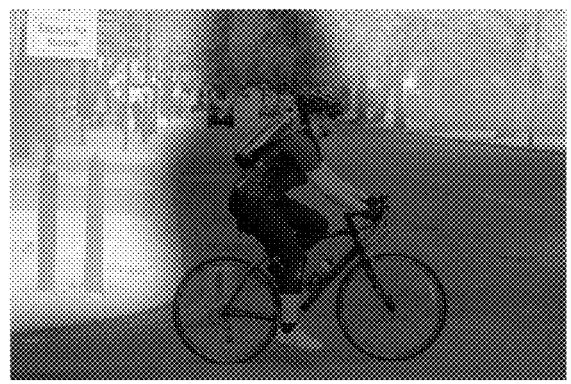
Figure 6C:
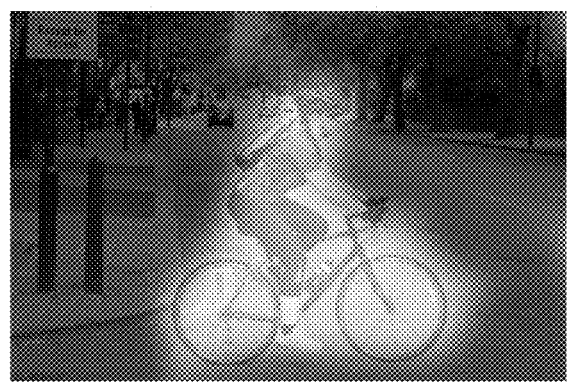

FIGS. 6A-6C illustrate example attention maps for an image. The image may include a visual capture of a cyclist, road, and background (e.g., sidewalk, trees). The attention maps may be generated using three time-steps. At time-step one (FIG. 6A), the model may focus on the road. At time-step two (FIG. 6B), the model may focus on the background. At time-step three (FIG. 6C), the model may focus on the cyclist. The union of the three attention maps (FIGS. 6A-6C) may result in every area of the image being covered, with no overlapping area. In each time-step, no single cell may be given a larger attention value than other cells.

Classification component 110 may be configured to classify the scene based on the set of two-dimensional outputs and/or other information. The classification of the scene may be performed by a fully connected layer that takes as input the set of two-dimensional outputs and/or other information. The classification of the scene may be performed based on visuals within the region(s) of the image that are the focus of the model. Classifying the scene may include classifying one or more activities within the scene. In some implementations, classification component 110 may be configured to classify a video based on classifications of one or more video frames of the video. For example, classification component 110 may classify a video by combining classification of multiple video frames within the video.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
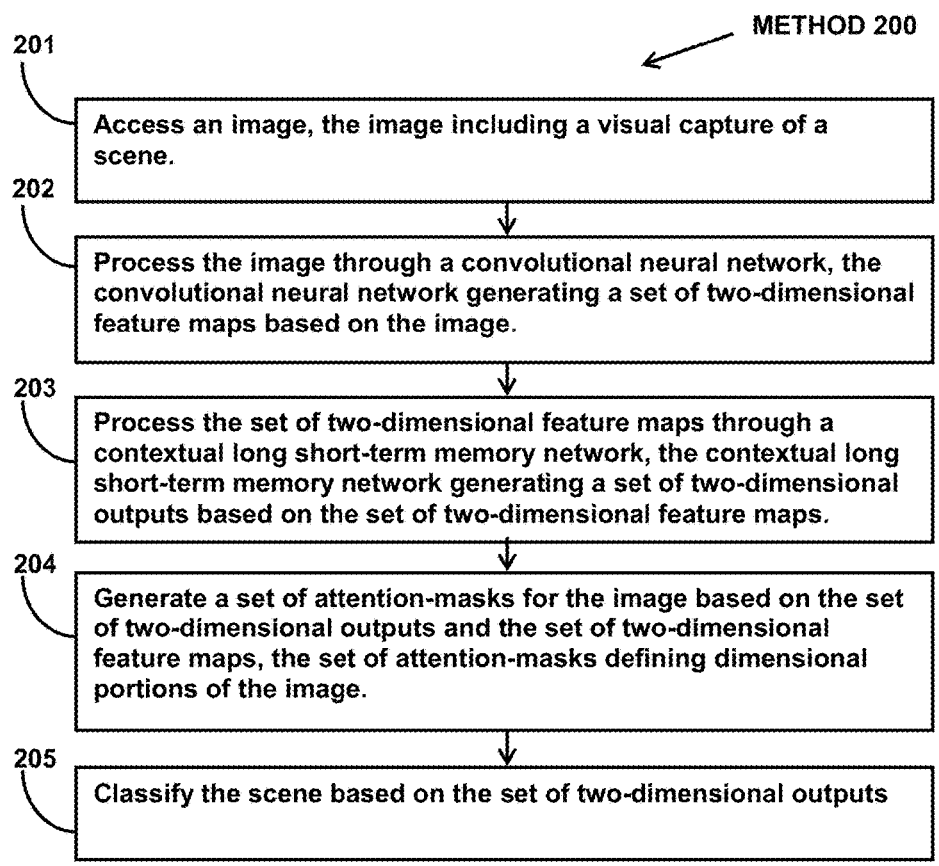
FIG. 2 illustrates a method for classifying activities captured within images.

FIG. 2 illustrates method 200 for classifying activities captured within images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, an image may be accessed. The image may include a visual capture of a scene. In some implementation, operation 201 may be performed by a processor component the same as or similar to access component 102 (Shown in FIG. 1 and described herein).

At operation 202, the image may be processed through a convolutional neural network. The convolutional neural network may generate a set of two-dimensional feature maps based on the image. In some implementations, operation 202 may be performed by a processor component the same as or similar to convolutional neural network component 104 (Shown in FIG. 1 and described herein).

At operation 203, the set of two-dimensional feature maps may be processed through a contextual long short-term memory unit. The contextual long short-term memory unit may generate a set of two-dimensional outputs based on the set of two-dimensional feature maps. In some implementations, operation 203 may be performed by a processor component the same as or similar to contextual LSTM unit component 106 (Shown in FIG. 1 and described herein).

At operation 204, a set of attention-masks for the image may be generated based on the set of two-dimensional outputs and the set of two-dimensional feature maps. The set of attention-masks may define dimensional portions of the image. In some implementations, operation 204 may be performed by a processor component the same as or similar to attention-masks component 108 (Shown in FIG. 1 and described herein).

At operation 205, the scene may be classified based on the set of two-dimensional outputs. In some implementations, operation 205 may be performed by a processor component the same as or similar to classification component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for classifying activities captured within images, the system comprising:
one or more physical processors configured by machine-readable instructions to:
access an image, the image including a visual capture of a scene;
process the image through a convolutional neural network, the convolutional neural network generating a set of two-dimensional feature maps based on the image;
process the set of two-dimensional feature maps through a contextual long short-term memory unit, the contextual long short-term memory unit generating a set of two-dimensional outputs based on the set of two-dimensional feature maps, wherein the contextual long short-term memory unit includes a loss function characterized by a non-overlapping loss, an entropy loss, and a cross-entropy loss and the non-overlapping loss, the entropy loss, and the cross-entropy loss are combined into the loss function through a linear combination with a first hyper parameter for the non-overlapping loss, a second hyper parameter for the entropy loss, and a third hyper parameter for the cross-entropy loss;
generate a set of attention-masks for the image based on the set of two-dimensional outputs and the set of two-dimensional feature maps, the set of attention-masks defining dimensional portions of the image; and
classify the scene based on the set of two-dimensional outputs.

2. The system of claim 1, wherein the convolutional neural network includes a plurality of convolution layers, and the set of two-dimensional feature maps is generated by a last convolution layer in the convolutional neural network.

3. The system of claim 2, wherein the set of two-dimensional feature maps is obtained from the convolutional neural network before the set of two-dimensional feature maps is flattened.

4. The system of claim 1, wherein the set of two-dimensional outputs is used to visualize the dimensional portions of the image.

5. The system of claim 1, wherein the set of two-dimensional outputs is used to constrain the dimensional portions of the image.

6. The system of claim 1, wherein the classification of the scene is performed by a fully connected layer that takes as input the set of two-dimensional outputs.

7. The system of claim 1, wherein the loss function discourages the set of attention masks defining a same dimensional portion of the image across multiple time-steps.

8. A method for classifying activities captured within images, the method comprising:
accessing an image, the image including a visual capture of a scene;
processing the image through a convolutional neural network, the convolutional neural network generating a set of two-dimensional feature maps based on the image;
processing the set of two-dimensional feature maps through a contextual long short-term memory unit, the contextual long short-term memory unit generating a set of two-dimensional outputs based on the set of two-dimensional feature maps, wherein the contextual long short-term memory unit includes a loss function characterized by a non-overlapping loss, an entropy loss, and a cross-entropy loss and the non-overlapping loss, the entropy loss, and the cross-entropy loss are combined into the loss function through a linear combination with a first hyper parameter for the non-overlapping loss, a second hyper parameter for the entropy loss, and a third hyper parameter for the cross-entropy loss;
generating a set of attention-masks for the image based on the set of two-dimensional outputs and the set of two-dimensional feature maps, the set of attention-masks defining dimensional portions of the image; and
classifying the scene based on the set of two-dimensional outputs.

9. The method of claim 8, wherein the convolutional neural network includes a plurality of convolution layers, and the set of two-dimensional feature maps is generated by a last convolution layer in the convolutional neural network.

10. The method of claim 9, wherein the set of two-dimensional feature maps is obtained from the convolutional neural network before the set of two-dimensional feature maps is flattened.

11. The method of claim 8, wherein the set of two-dimensional outputs is used to visualize the dimensional portions of the image.

12. The method of claim 8, wherein the set of two-dimensional outputs is used to constrain the dimensional portions of the image.

13. The method of claim 8, wherein the classification of the scene is performed by a fully connected layer that takes as input the set of two-dimensional outputs.

14. The method of claim 8, wherein the loss function discourages the set of attention masks defining a same dimensional portion of the image across multiple time-steps.

15. A system for classifying activities captured within images, the system comprising:
one or more physical processors configured by machine-readable instructions to:
access an image, the image including a visual capture of a scene;
process the image through a convolutional neural network, the convolutional neural network generating a set of two-dimensional feature maps based on the image;
process the set of two-dimensional feature maps through a contextual long short-term memory unit, the contextual long short-term memory unit generating a set of two-dimensional outputs based on the set of two-dimensional feature maps, wherein:
the contextual long short-term memory unit includes a loss function characterized by a non-overlapping loss, an entropy loss, and a cross-entropy loss; and
the non-overlapping loss, the entropy loss, and the cross-entropy loss are combined into the loss function through a linear combination with a first hyper parameter for the non-overlapping loss, a second hyper parameter for the entropy loss, and a third hyper parameter for the cross-entropy loss;
generate a set of attention-masks for the image based on the set of two-dimensional outputs and the set of two-dimensional feature maps, the set of attention-masks defining dimensional portions of the image, wherein the loss function discourages the set of attention masks defining a same dimensional portion of the image across multiple time-steps; and
classify the scene based on the set of two-dimensional outputs.

16. The system of claim 15, wherein the convolutional neural network includes a plurality of convolution layers, and the set of two-dimensional feature maps is generated by a last convolution layer in the convolutional neural network and is obtained from the convolutional neural network before the set of two-dimensional feature maps is flattened.

\* \* \* \* \*